June 11, 1940.    W. BEATSON    2,204,467
FRYING PAN
Original Filed July 16, 1938
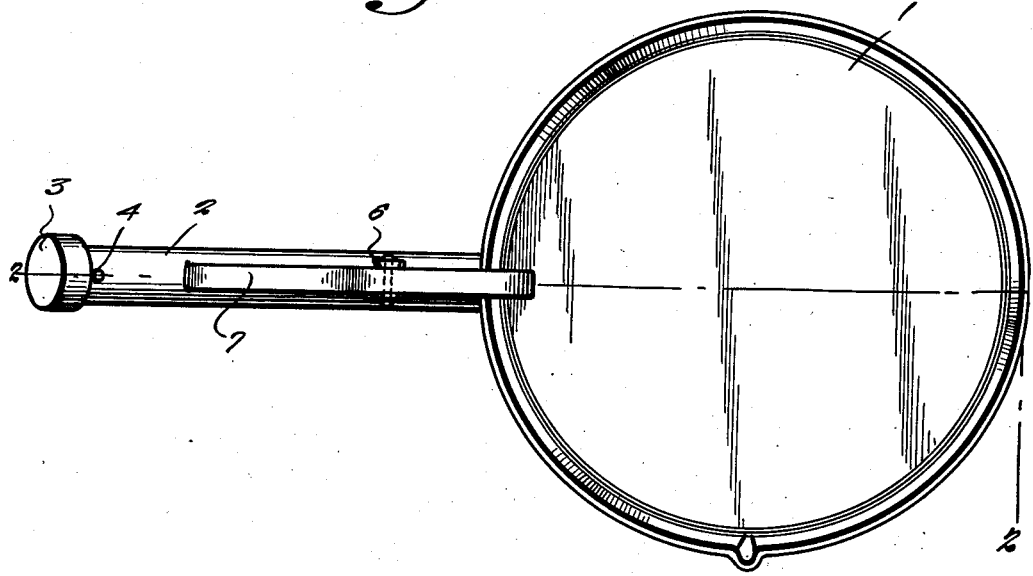
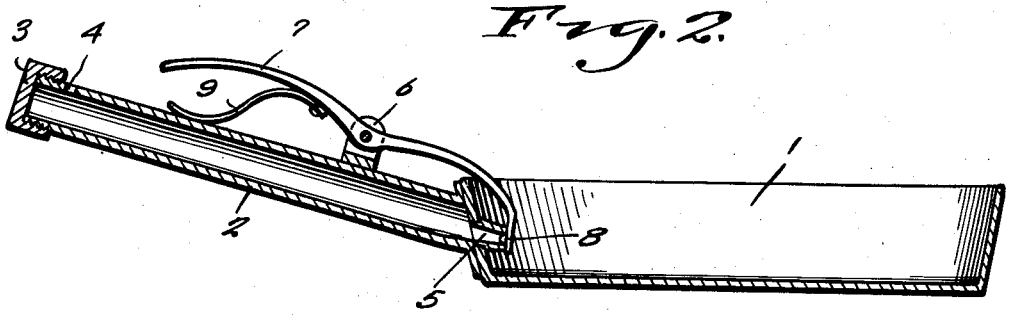
Inventor
William Beatson
By Clarence A. O'Brien
Hyman Berman
Attorneys Patented June 11, 1940

2,204,467

UNITED STATES PATENT OFFICE 2,204,467

FRYING PAN

William Beatson, Long Branch, N. J.

Application July 16, 1938, Serial No. 219,659
Renewed May 4, 1940

1 Claim. (Cl. 53—7)

The present invention relates to new and useful improvements in frying pans and has for its primary object to provide, in a manner as hereinafter set forth, an article of this character embodying means for conveniently supplying the usual grease or oil thereto.

Another very important object of the invention is to provide a frying pan of the aforementioned character comprising novel means whereby the discharge of the grease or oil into said pan may be controlled as desired.

Other objects of the invention are to provide a frying pan of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a top plan view of an embodiment of the invention.

Figure 2 is a vertical longitudinal section, taken substantially on the line 2—2 of Fig. 1.

Referring now to the drawing in detail, it will be seen that the embodiment of the invention which has been illustrated comprises a pan 1 of the usual form. Rigidly secured in any suitable manner on the wall of the pan 1 is a tubular handle 2 which is open at both ends. It may be well to here state that the tubular handle 2 constitutes a container for the reception of grease or oil. A removable cap 3 is provided on the outer end of the tubular handle 2 for the purpose of permitting the oil or grease to be placed therein. A vent 4 is provided in the tubular handle 2 adjacent the cap 3.

Rigidly mounted on the wall of the pan 1 and projecting into said pan is a tapered nozzle 5 which communicates with the tubular handle 2 for receiving grease or oil therefrom. Fixed on the tubular handle 2 at an intermediate point is a substantially U-shaped bracket 6. Journalled at an intermediate point in the bracket 6 for swinging movement in a vertical plane is a thumb lever 7. At its forward end, the lever 7 is provided with a valve 8 which is engageable with the nozzle 5 in a manner to close said nozzle. A spring 9 is mounted on the lever 7 and engaged with the tubular handle 2 in a manner to actuate said lever for engaging the valve 8 with the nozzle 5.

It is thought that the operation of the device will be readily apparent from a consideration of the foregoing. As hereinbefore indicated, the grease or oil is placed in the tubular handle 2 by removing the cap 3. When the frying pan is in use, the tubular handle 2 is warmed, thus melting or softening the grease or oil therein. To permit the grease or oil to flow by gravity from the tubular handle 2 through the nozzle 5 into the pan 1 it is only necessary to engage the thumb with the lever 7 and actuate said lever against the tension of the spring 9, thus disengaging the valve 8 from said nozzle 5. Of course, when the lever 7 is released said lever is immediately actuated by the spring 9 to again engage the valve 8 with the nozzle 5.

It is believed that the many advantages of a frying pan constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A device of the class described comprising a pan, a tubular handle, for the reception of grease, fixed on said pan, a nozzle fixed on the pan and projecting thereinto, said nozzle communicating with the handle for receiving grease therefrom, a substantially U-shaped bracket mounted on the handle at an intermediate point, a lever pivotally mounted in said bracket at an intermediate point and extending over and into the pan, a valve on one end of said lever engageable with the nozzle for closing said nozzle, and a spring for actuating the lever for engaging the valve with the nozzle.

WILLIAM BEATSON.